(12) United States Patent
Li et al.

(10) Patent No.: US 12,551,021 B1
(45) Date of Patent: Feb. 17, 2026

(54) MODULAR SOFA ASSEMBLY

(71) Applicant: Yilong Li, Guangdong (CN)

(72) Inventors: Yilong Li, Guangdong (CN); Mingbin Yang, Guangdong (CN); Guangzhong Li, Guangdong (CN)

( * ) Notice: Subject to any disclaimer, the term of this patent is extended or adjusted under 35 U.S.C. 154(b) by 0 days.

(21) Appl. No.: 19/194,699

(22) Filed: Apr. 30, 2025

(51) Int. Cl.
| | |
|---|---|
| *A47C 13/00* | (2006.01) |
| *A47B 87/00* | (2006.01) |
| *A47C 7/62* | (2006.01) |
| *A47C 7/68* | (2006.01) |
| *A47C 15/00* | (2006.01) |
| *A47C 20/04* | (2006.01) |
| *F16B 12/20* | (2006.01) |
| *F16B 12/26* | (2006.01) |
| *A47C 7/38* | (2006.01) |

(52) U.S. Cl.
CPC .......... *A47C 13/005* (2013.01); *A47B 87/007* (2013.01); *A47C 7/624* (2018.08); *A47C 7/68* (2013.01); *A47C 15/002* (2013.01); *A47C 20/041* (2013.01); *F16B 12/20* (2013.01); *F16B 12/26* (2013.01); *A47C 7/383* (2013.01)

(58) Field of Classification Search
CPC ......... A47C 13/005; A47C 7/624; A47C 7/68; A47C 15/002; A47C 7/383; A47B 87/007; F16B 12/20; F16B 12/26
USPC ... 297/440.1, 440.14–440.16, 440.2, 440.21, 297/394, 411.27
See application file for complete search history.

(56) References Cited

U.S. PATENT DOCUMENTS

| | | | | |
|---|---|---|---|---|
| 2,623,575 | A * | 12/1952 | Challis | A47C 7/383 297/401 |
| 4,655,013 | A * | 4/1987 | Ritland | E04B 1/14 52/592.1 |
| 5,651,220 | A * | 7/1997 | dit Felix | E04B 1/6116 52/285.3 |
| 7,389,618 | B1 * | 6/2008 | Herkstroeter | E04B 1/34321 52/285.3 |
| 9,277,826 | B2 * | 3/2016 | Nelson | A47C 3/029 |
| 9,277,862 | B2 * | 3/2016 | Rao | A61B 3/165 |
| 10,123,623 | B2 * | 11/2018 | Nelson | A47C 17/045 |
| 10,743,676 | B1 * | 8/2020 | Galjour | A47C 1/124 |
| D984,877 | S * | 5/2023 | Yue | A47C 13/005 D8/371 |
| 11,882,939 | B2 * | 1/2024 | Gansow | A47C 31/02 |
| 12,171,338 | B1 * | 12/2024 | Zhao | A47C 1/032 |
| D1,074,247 | S * | 5/2025 | Nelson | D6/381 |
| 2007/0210631 | A1 * | 9/2007 | Berning | A47C 13/005 297/248 |

(Continued)

*Primary Examiner* — Robert Canfield

(57) ABSTRACT

This application pertains to the furniture technology field, providing an assembled sofa comprising at least two seat frames and two first connectors. Each long side of the seat frame has two spaced first mounting grooves, while each short side contains two spaced second mounting grooves, with identical spacing between first and second groove pairs. The first connector includes a connection section, two engagement portions, and two hook portions. The engagement portions extend from both ends of the connection section. When adjacent seat frames abut each other, the connection section bridges both frames with engagement portions secured in either first or second mounting grooves. The hook portions contact groove walls of corresponding mounting slots. This configuration enables simplified sofa assembly through interlocking components.

10 Claims, 11 Drawing Sheets

(56) References Cited

U.S. PATENT DOCUMENTS

| | | | | |
|---|---|---|---|---|
| 2009/0045666 | A1* | 2/2009 | Westendorf | A47C 13/005 |
| | | | | 297/440.1 |
| 2013/0283587 | A1* | 10/2013 | Mehringer | A47B 87/007 |
| | | | | 403/20 |
| 2017/0143122 | A1* | 5/2017 | Nelson | A47C 1/0352 |
| 2017/0367486 | A1* | 12/2017 | Nelson | A47C 13/005 |
| 2018/0000244 | A1* | 1/2018 | Nelson | A47C 17/04 |
| 2020/0187654 | A1* | 6/2020 | Mutyala | F16B 12/60 |
| 2021/0337974 | A1* | 11/2021 | Chen | A47C 4/028 |
| 2023/0038420 | A1* | 2/2023 | Eglinton | A47C 4/02 |
| 2023/0320484 | A1* | 10/2023 | Hochgesang | F16B 12/2009 |
| 2024/0023715 | A1* | 1/2024 | Chen | A47C 4/02 |
| 2024/0108145 | A1* | 4/2024 | Armond | A47C 13/005 |
| 2024/0341486 | A1* | 10/2024 | Aubé | A47C 13/005 |
| 2024/0341487 | A1* | 10/2024 | Checchin | A47C 1/124 |

* cited by examiner

MODULAR SOFA ASSEMBLY

FIELD OF THE APPLICATION

The present application relates to the field of furniture technology, and particularly to a modular sofa assembly.

BACKGROUND

A sofa, a common household furniture item, is a cushioned multi-seat chair. To facilitate transportation and handling, sofas are typically designed with interconnectable modular structures.

In conventional designs, a sofa assembly comprises two sofa units. The seat frames of the two units are positionally connected via multiple connecting plates. Fastening bolts are then inserted through aligned apertures in the seat frames and secured with threaded fastening nuts to rigidly fix the two units, thereby completing the sofa assembly.

However, in practice, the aforementioned design requires a large number of components and involves complex assembly steps during interconnection, leading to operational inefficiency. This limitation underscores the need for an improved modular sofa assembly.

SUMMARY

To address the need for simplified sofa assembly, the present application provides a modular sofa assembly. The disclosed solution adopts the following technical scheme:

A modular sofa assembly comprises at least two seat frames and at least two first connecting pieces. Each seat frame is configured in a rectangular shape, with two first installation grooves spaced apart on each longitudinal side of the seat frame and two second installation grooves spaced apart on each lateral side of the seat frame. The distance between the two first installation grooves is equal to the distance between the two second installation grooves.

Each first connecting piece includes a connecting portion, two snap-fit portions, and two hook portions. The two snap-fit portions are respectively disposed at opposite ends of the connecting portion. The hook portions are positioned at distal ends of the snap-fit portions away from the connecting portion and are curved outward in directions away from each other. When assembling the sofa, a side of one seat frame abuts against a side of another seat frame. The connecting portion spans across the two seat frames, with the two snap-fit portions respectively engaged with the first installation grooves or the second installation grooves of the two seat frames. Each hook portion abuts against an inner wall of the corresponding first or second installation groove.

By adopting this technical solution, during practical assembly, a user first aligns one seat frame with another such that the first or second installation grooves of the two seat frames are mutually aligned. Subsequently, the two first connecting pieces are deployed to interconnect the seat frames: each snap-fit portion is snap-fitted into a corresponding first or second installation groove, while the hook portions exert outward pressure against the groove walls. This configuration achieves a simplified structure and user-friendly operation, significantly streamlining the sofa assembly process. Additionally, the outward curvature of the hook portions ensures secure engagement between the seat frames, thereby enhancing structural stability without requiring auxiliary fasteners.

Preferably, two third installation grooves are spaced apart on each lateral side of the seat frame, and a distance between the two third installation grooves is equal to a distance between the two second installation grooves.

By adopting the above technical solution, the two third installation grooves are provided to improve flexibility in splicing between the two seat frames.

Preferably, a distance between distal ends of the two snap-fit portions away from the connecting portion is less than a length of the connecting portion.

By adopting the above technical solution, the distance between the distal ends of the two snap-fit portions away from the connecting portion is set to be less than the length of the connecting portion, so as to facilitate insertion of the snap-fit portions into the first installation grooves or the second installation grooves.

Preferably, the assembled sofa further includes a functional component spliced with the seat frame, and the functional component is a backrest, an armrest, or a functional table.

Preferably, the backrest includes a backrest body and two second connecting pieces. The two second connecting pieces are spaced apart on one side of the backrest body and respectively snap-fitted into two adjacent first installation grooves or two adjacent second installation grooves.

By adopting the above technical solution, the backrest body and the two second connecting pieces are provided. The backrest body is connected to the seat frame via the two second connecting pieces snap-fitted into the two first installation grooves or the two second installation grooves, thereby facilitating installation of the backrest.

Preferably, the backrest further includes a third connecting piece pivotally connected to a lower end of the backrest body. A lower end of the seat frame is provided with a plurality of snap heads spaced apart along a circumferential direction of the seat frame, and the third connecting piece is snap-fitted into one of the snap heads.

By adopting the above technical solution, the third connecting piece is provided. By rotating the third connecting piece to snap-fit it into one of the snap heads, a connection between the backrest body and the seat frame is further realized, thereby improving stability of the backrest installation.

Preferably, the functional table includes a mounting base. Two snap grooves are spaced apart on each side of the mounting base, and a distance between the two snap grooves is equal to a distance between the two second installation grooves. One of the snap-fit portions of the first connecting piece is snap-fitted into the first installation groove or the second installation groove, while the other snap-fit portion is snap-fitted into one of the snap grooves.

By adopting the above technical solution, the mounting base is provided to enable the functional table to be connected to the seat frame via the first connecting piece, thereby enhancing the sofa's practicality.

Preferably, the assembled sofa further includes an electric seat. The electric seat includes a base, a back panel, a seat cushion, a leg rest, a driving member, and a controller. The back panel and the seat cushion are disposed on an upper end of the base. The leg rest is rotationally connected to the base, the driving member is configured to drive rotation of the leg rest, and the controller is electrically connected to the driving member.

By adopting the above technical solution, the electric seat is provided. By controlling the driving member via the controller, the leg rest can be rotated to adapt to different user requirements, thereby improving versatility and comfort of the electric seat.

Preferably, the controller is disposed within a side portion of the seat cushion.

By adopting the above technical solution, the controller is embedded within the side portion of the seat cushion, effectively addressing issues of exposed controllers in conventional designs. This eliminates the need for separate protective measures during transportation and enhances operational accessibility, thereby improving durability and safety of the sofa.

Preferably, the electric seat further includes a headrest and a fourth connecting piece. The headrest is detachably connected to the fourth connecting piece, and both ends of the fourth connecting piece are snap-fitted to opposing ends of the back panel.

By adopting the above technical solution, the headrest and the fourth connecting piece are provided. The headrest is mounted to the back panel via the fourth connecting piece, facilitating installation of the headrest. Users obtain ergonomic support while reclining, thereby significantly improving comfort.

In summary, the present application provides at least the following beneficial technical effects:
1. By abutting a side of one seat frame against a side of another seat frame, the first or second installation grooves of the two seat frames are aligned. Two first connecting pieces are then engaged to interconnect the seat frames, wherein the snap-fit portions of each first connecting piece are snap-fitted into the first or second installation grooves of the two seat frames. This configuration achieves a structurally simple and operationally convenient solution for sofa assembly.
2. A backrest body is connected to the seat frame via two second connecting pieces snap-fitted into two adjacent first or second installation grooves. This modular attachment mechanism streamlines backrest installation while maintaining structural rigidity.
3. Embedding the controller within a side portion of the seat cushion addresses issues of exposed controllers in conventional designs. This eliminates the need for protective measures during transportation, improves user accessibility, and enhances the sofa's overall durability and safety.

BRIEF DESCRIPTION OF THE DRAWINGS

As shown in FIGS. 1-11:
1. Seat Frame
11. First Installation Groove
12. Second Installation Groove
13. Third Installation Groove
14. Snap Head
2. First Connecting Piece
21. Connecting Portion
22. Snap-Fit Portion
23. Hook Portion
3. Backrest
31. Backrest Body
32. Second Connecting Piece
33. Third Connecting Piece
4. Armrest
5. Functional Table
51. Mounting Base
52. Snap Groove
53. Movable Cup Holder
54. Storage Drawer
55. Charging Base
56. Wireless Charging Platform
6. Electric Seat
61. Base
62. Back Panel
63 Seat Cushion
64. Leg Rest
65. Driving Member
66. Controller
661. Housing
662. Button
67. Headrest
68. Fourth Connecting Piece
681. Mounting Portion
682. First Connecting Portion
683. Second Connecting Portion
69. Back Cushion While the technology is susceptible to various modifications and alternative forms, specifics thereof have been shown by way of example and drawings, and will be described in detail. It should be understood, however, that the application is not limited to the particular embodiments described. On the contrary, the application is to cover modifications, equivalents, and alternatives falling within the spirit and scope of the technology.

DETAILED DESCRIPTION OF EMBODIMENTS

The embodiments of the present technology described herein are not intended to be exhaustive or to limit the technology to the precise forms disclosed in the following detailed description. Rather, the embodiments are chosen and described so that others skilled in the art can appreciate and understand the principles and practices of the present technology.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

The following provides a detailed explanation of the present application with reference to FIGS. 1-11.

An embodiment of the present application discloses a modular sofa assembly.

Figure 1:
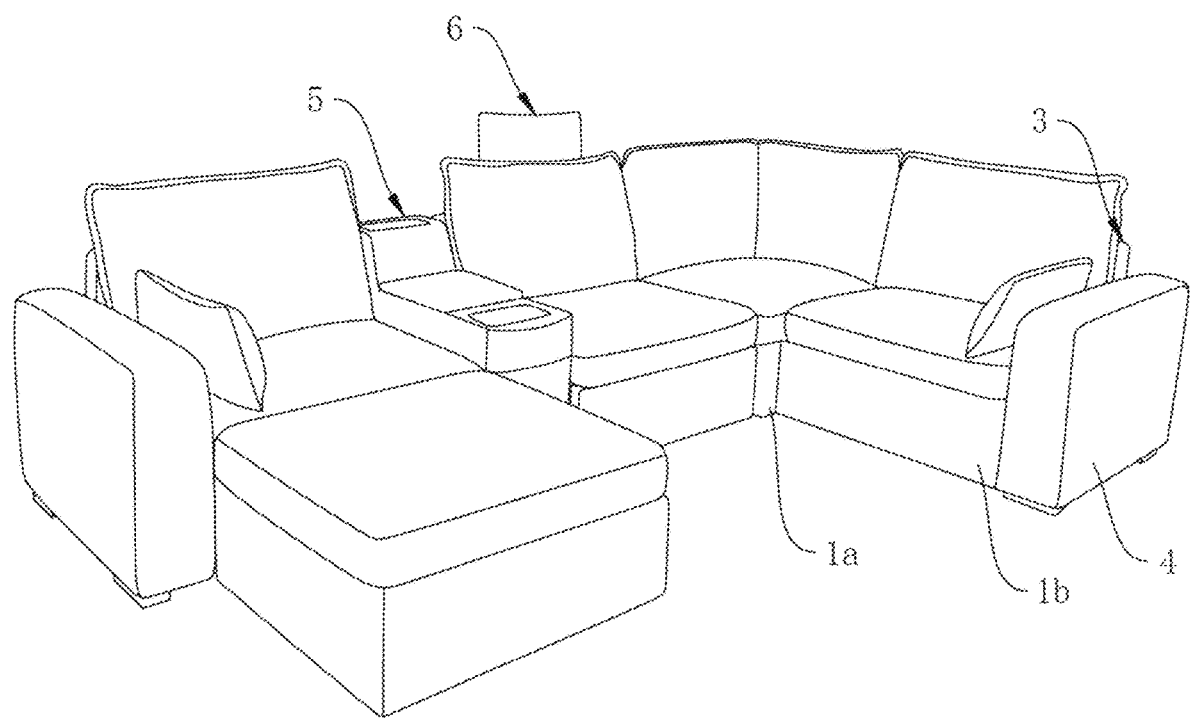
FIG. 1 is a schematic view of the overall structure of the modular sofa assembly according to an embodiment of the present application.
Figure 2:
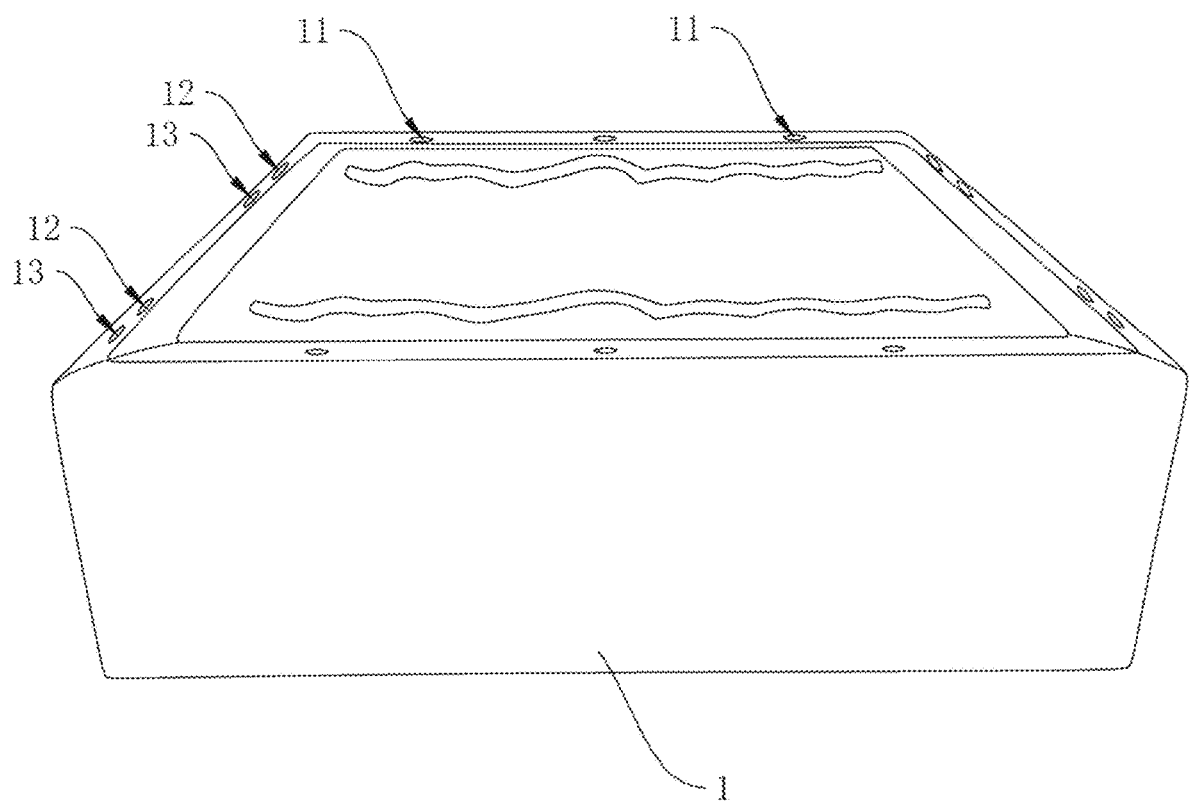
FIG. 2 is a schematic view of the overall structure of the seat frame according to an embodiment of the present application.

Referring to FIGS. 1 and 2, the modular sofa assembly comprises at least two seat frames 1 (labeled as 1a and 1b in FIG. 1). Each seat frame 1 is configured in a rectangular shape. In one example, the seat frame 1 may have dimensions of 80 cm×90 cm to ensure ergonomic seating depth, maximize seating width, and reduce logistics costs while improving transportation efficiency.

Two first installation grooves 11 are spaced apart on each longitudinal side (the longer upper side) of the seat frame 1, and two second installation grooves 12 are spaced apart on each lateral side (the shorter upper side) of the seat frame 1. The distance between the two first installation grooves 11 on the same longitudinal side is equal to the distance between the two second installation grooves 12 on the same lateral side.

Figure 3:
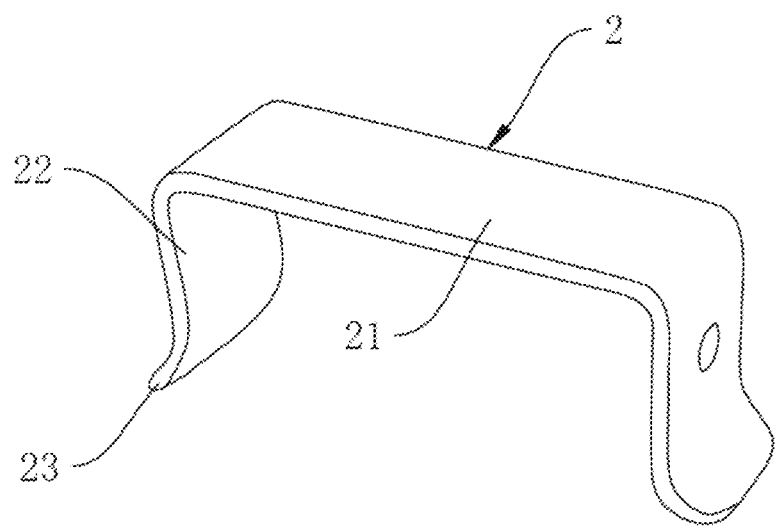
FIG. 3 Schematic view of the overall structure of the first connecting piece according to an embodiment of the present application.
Figure 4:
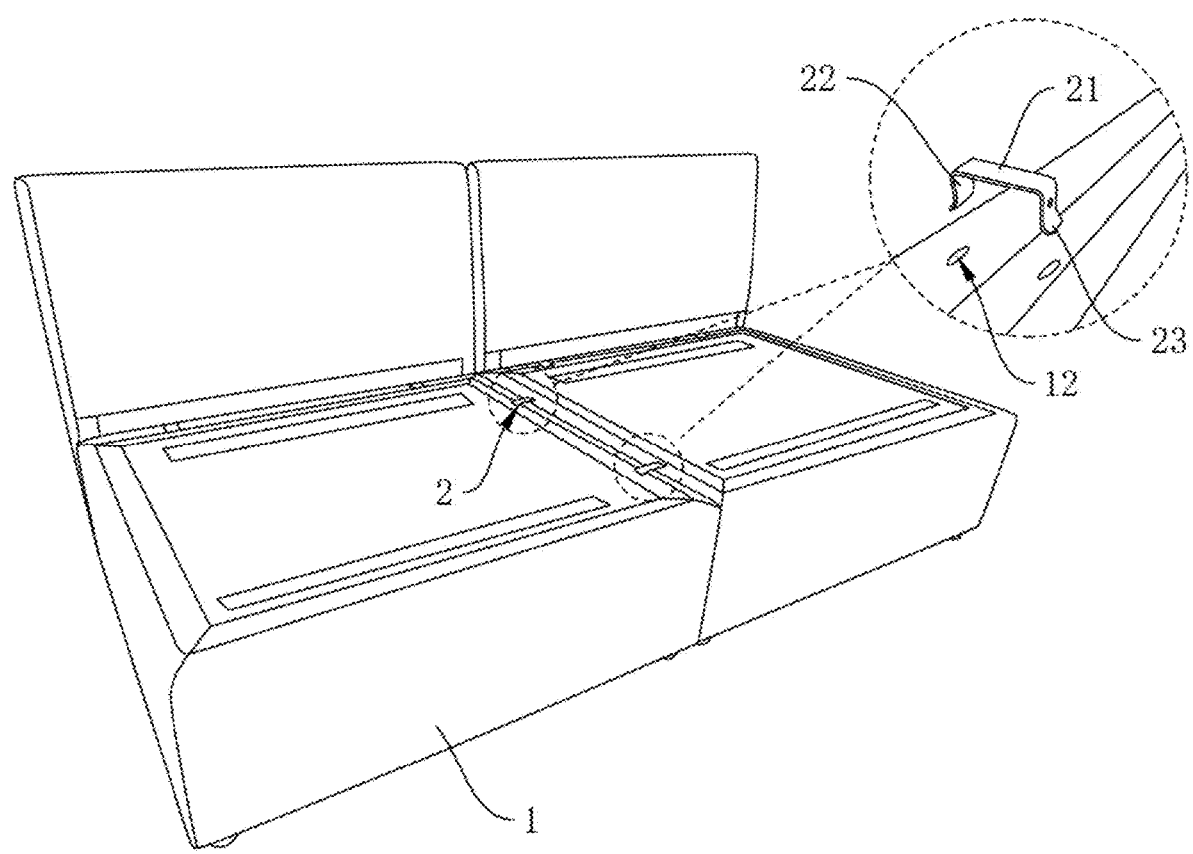
FIG. 4 is a schematic view of the connection structure between two seat frames according to an embodiment of the present application.

Referring to FIGS. 3 and 4, the modular sofa assembly further includes at least two first connecting pieces 2. Each first connecting piece 2 comprises a connecting portion 21, two snap-fit portions 22, and two hook portions 23. Both the connecting portion 21 and the snap-fit portions 22 are configured as rectangular plates. The two snap-fit portions 22 are integrally connected to opposite ends of the connecting portion 21. The two hook portions 23 are integrally connected to distal ends of the snap-fit portions 22 away from the connecting portion 21 and are curved outward in directions away from each other.

To assemble the sofa, as illustrated in FIG. 4, a lateral side (short side) of one seat frame 1 is abutted against a lateral side (short side) of another seat frame 1. The two seat frames 1 are then interconnected using two first connecting pieces 2. Specifically, the connecting portion 21 spans across upper ends of the two seat frames 1, while the two snap-fit portions 22 are snap-fitted into the second installation grooves 12 of the respective seat frames 1. This configuration achieves a structurally simple and operationally convenient connection between the two seat frames 1. Additionally, the outwardly curved hook portions 23 abut against inner walls of the second installation grooves 12, ensuring stability of the interconnected seat frames 1.

It is noted that, since the distance between the two first installation grooves 11 on any side of the seat frame 1 is equal to the distance between the two second installation grooves 12 on any side, the seat frames 1 can be interconnected in multiple orientations:

A longitudinal side (long side) of one seat frame 1 may abut a longitudinal side of another seat frame 1;

A longitudinal side of one seat frame 1 may abut a lateral side of another seat frame 1.

This versatility enables diverse assembly configurations. For example, abutting a longitudinal side of one seat frame 1 against a lateral side of another seat frame 1 creates an offset L-shaped arrangement, enhancing the sofa's structural stability during use.

Referring to FIG. 2

In some embodiments, two third installation grooves 13 are further spaced apart on each lateral side of the seat frame 1. The distance between the two third installation grooves 13 on the same side is equal to the distance between the two second installation grooves 12. This configuration allows the third installation grooves 13 to cooperate with the first connecting pieces 2, enabling interconnection of two seat frames 1 at varying positions. Such flexibility enhances modular assembly adaptability and facilitates sofa configuration.

Referring to FIG. 3

In some embodiments, the distance between distal ends of the two snap-fit portions 22 (away from the connecting portion 21) is less than the length of the connecting portion 21. This dimensional constraint ensures smooth insertion of the snap-fit portions 22 into the first installation grooves 11 or second installation grooves 12, thereby simplifying interconnection of the seat frames 1.

Figure 5:
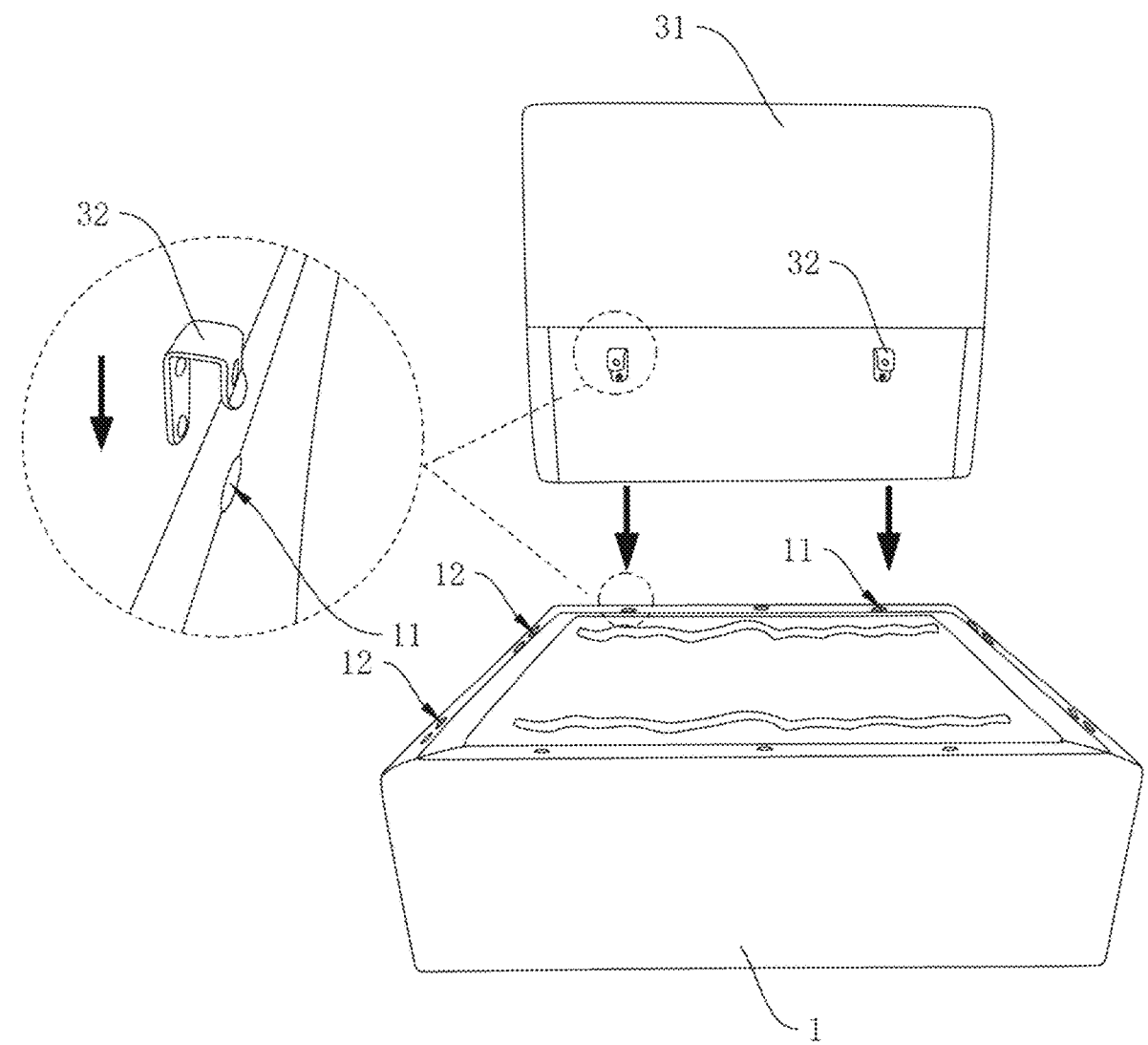
FIG. 5 is a schematic view of the connection structure between the seat frame and the backrest according to an embodiment of the present application.

Referring to FIGS. 1 and 5

In some embodiments, the modular sofa assembly further includes functional components. The functional component may be a backrest 3, an armrest 4, or a functional table 5, which can be modularly attached to the seat frame 1 according to actual requirements. In practical applications, users may interconnect multiple seat frames 1 and selectively attach functional components such as the backrest 3, armrest 4, or functional table 5. Alternatively, a single seat frame 1 can be combined with functional components to form a standalone single-seat unit.

Referring to FIG. 5

The backrest 3 includes a backrest body 31 and two second connecting pieces 32. The backrest 3 abuts against a side of the seat frame 1. The two second connecting pieces 32 are configured as right-angled plates and are fixedly connected to the backrest body 31 via bolts at intervals. The second connecting pieces 32 are snap-fitted into two first installation grooves 11 of the seat frame 1, thereby securing the backrest body 31 to the seat frame 1. Notably, the second connecting pieces 32 may alternatively be snap-fitted into two second installation grooves 12 to accommodate diverse user preferences.

Figure 6:
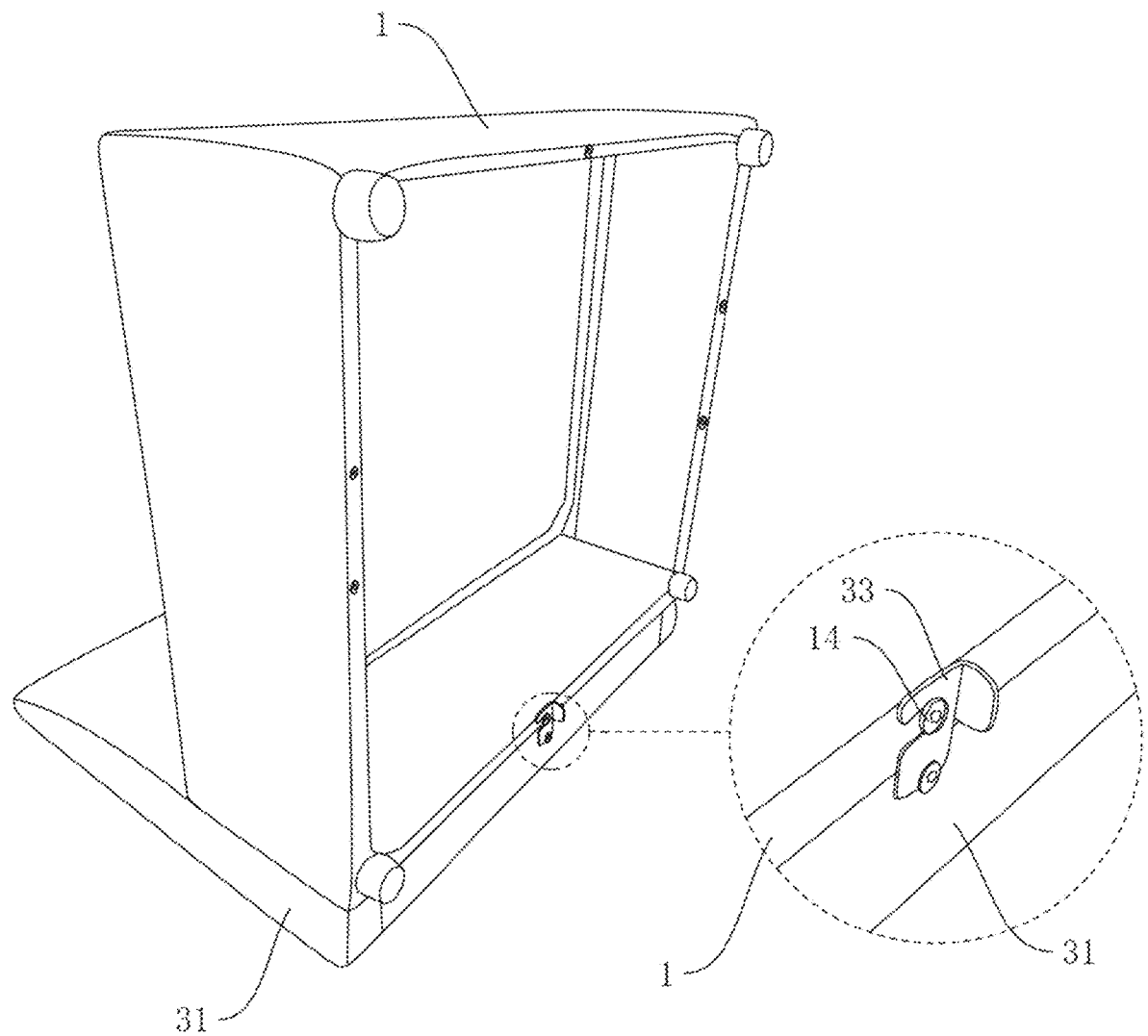
FIG. 6 is a schematic view of the connection structure between the seat frame and the backrest according to an embodiment of the present application.

Referring to FIG. 6

In some embodiments, the backrest 3 further includes a third connecting piece 33 rotationally connected to a lower end of the backrest body 31. A lower end of the seat frame 1 is fixedly provided with four snap heads 14 uniformly spaced along a circumferential direction of the seat frame 1. By rotating the third connecting piece 33 to snap-fit it into a corresponding snap head 14, a connection between the backrest body 31 and the seat frame 1 is further reinforced, thereby improving stability of the backrest installation. The armrest 4 is connected to the seat frame 1 using the same method as the backrest 3, which is not reiterated herein. Additionally, the seat frame 1 is configured with a hollow structure, allowing the armrest 4 and backrest 3 to be stored within the seat frame 1 during transportation to reduce logistics costs.

Figure 7:
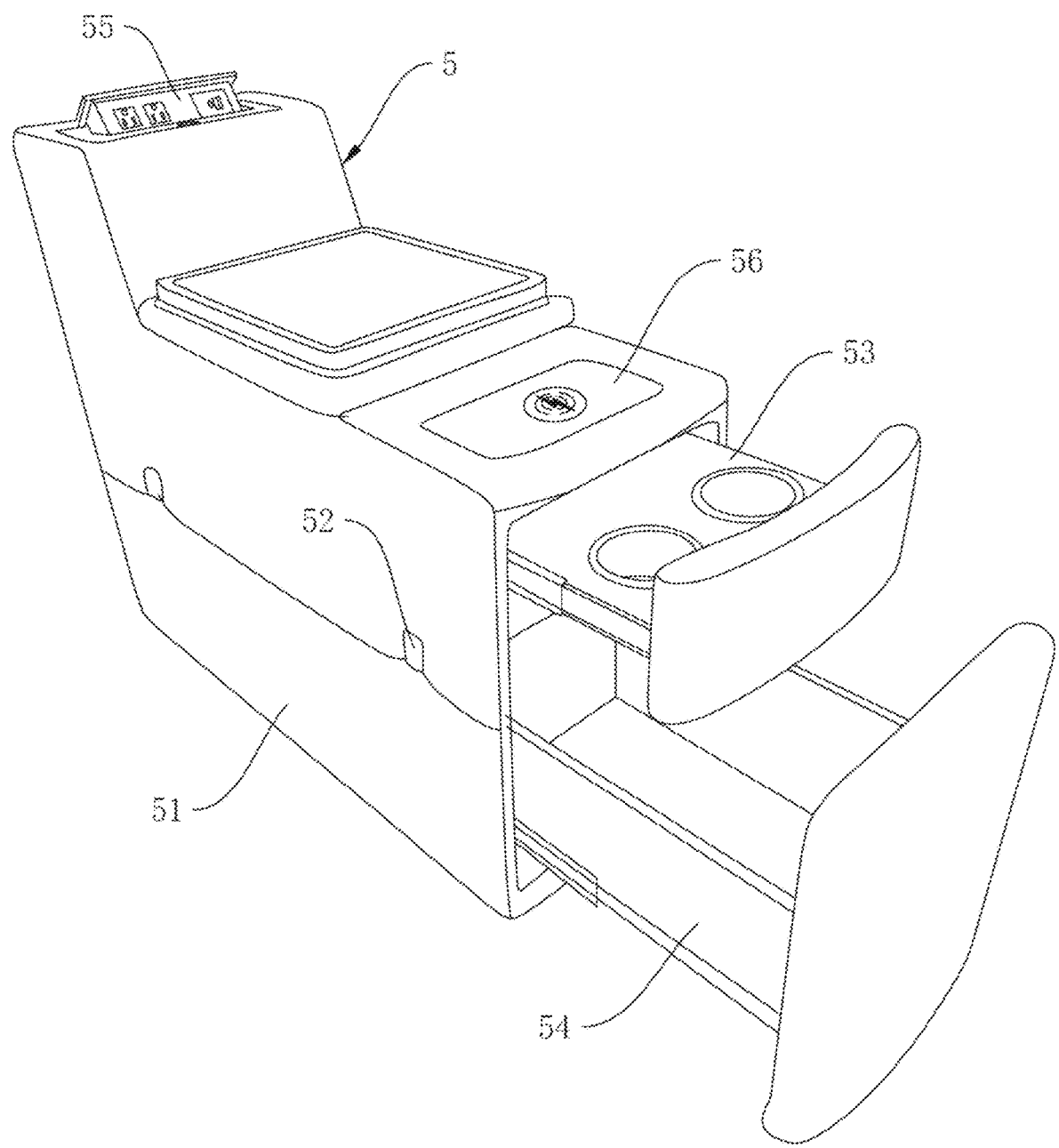
FIG. 7 is a schematic view of the overall structure of the functional table according to an embodiment of the present application.

Referring to FIG. 7

In some embodiments, the functional table 5 includes a mounting base 51. Two snap grooves 52 are spaced apart on each side of the mounting base 51, and a distance between the two snap grooves 52 is equal to the distance between the two second installation grooves 12. The functional table 5 is interconnected with the seat frame 1 via the first connecting piece 2. Specifically, one snap-fit portion 22 of the first connecting piece 2 is snap-fitted into the first installation groove 11 or second installation groove 12, while the other snap-fit portion 22 is snap-fitted into one of the snap grooves 52, achieving seamless integration of the functional table 5 with the seat frame 1. This configuration enhances the sofa's versatility. Notably, the functional table 5 may also be used independently.

In some embodiments, the functional table 5 further includes:

A movable cup holder 53 slidably connected to the mounting base 51 for holding cups or beverages; A storage drawer 54 slidably connected to the mounting base 51 for item storage; A charging base 55 pivotally mounted on an upper end of the mounting base 51 for charging electronic devices or powering external equipment; A wireless charging platform 56 disposed on the upper end of the mounting base 51 for wireless charging of electronic devices.

Figure 8:
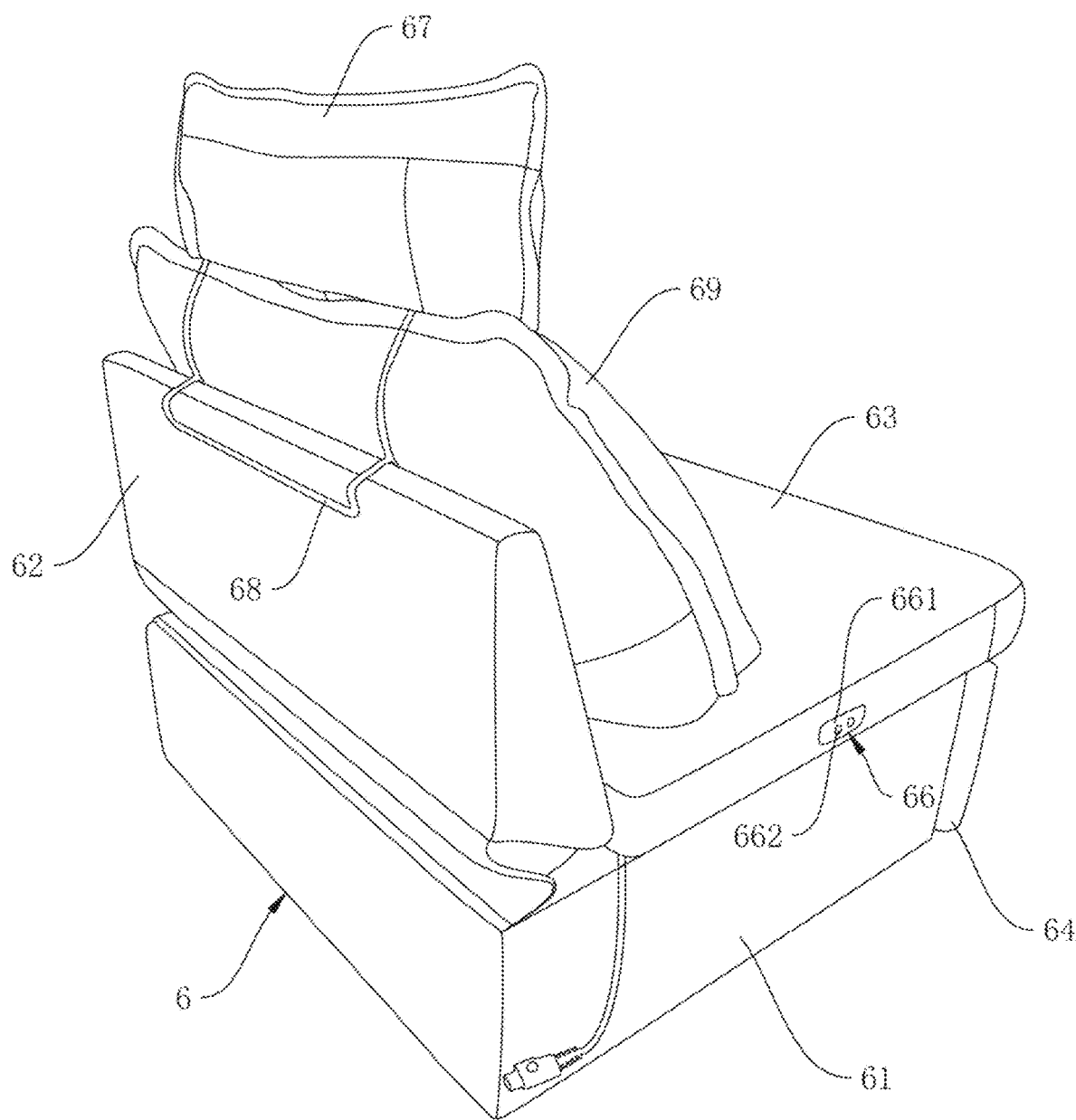
FIG. 8 is a schematic view of the overall structure of the electric seat according to an embodiment of the present application.
Figure 9:
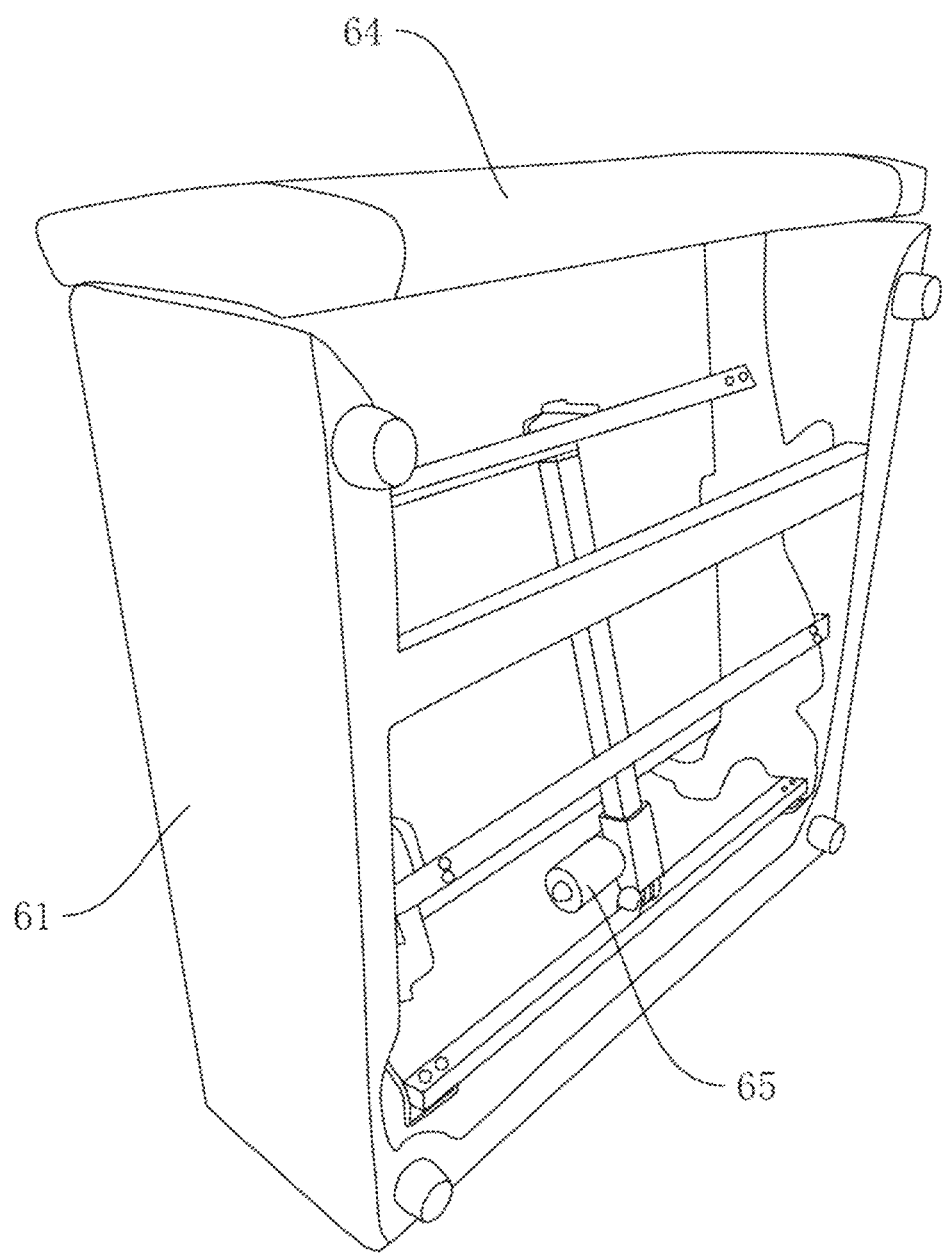
FIG. 9 is a schematic view of the bottom structure of the electric seat according to an embodiment of the present application.

Referring to FIGS. 8 and 9

In some embodiments, the modular sofa assembly further includes an electric seat 6. The electric seat 6 comprises a base 61, a back panel 62, a seat cushion 63, a leg rest 64, a driving member 65, and a controller 66. The base 61 can be interconnected with the seat frame 1 via the first connecting piece 2, using the same connection method as described for interconnecting two seat frames 1, which will not be reiterated here. Notably, the base 61 may also be interconnected with the armrest 4 or functional table 5.

The back panel 62 is movably connected to a side of the base 61, and its position is adjustable via the driving member 65. The seat cushion 63 is disposed on an upper end of the base 61 to enhance user comfort. The leg rest 64 is rotationally connected to a side of the base 61 opposite the back panel 62. The driving member 65, implemented as an electric cylinder in this embodiment, is rotationally connected to the base 61, with its power output shaft rotationally coupled to the leg rest 64 to drive its movement. In alternative embodiments, the driving member 65 may be a pneumatic or hydraulic actuator, though the present application imposes no such limitations. The controller 66 is electrically connected to the driving member 65 to regulate its operation. By operating the controller 66, users can adjust the elevation of the leg rest 64 to meet diverse ergonomic needs, thereby improving the versatility and comfort of the electric seat 6.

Referring to FIG. 8

In some embodiments, the controller 66 is embedded within a side portion of the seat cushion 63. Specifically, the controller 66 includes a housing 661, an inner casing (not shown), electronic components (not shown), and a button 662. The housing 661 is positioned on an exterior of the seat cushion 63, while the inner casing is located within an interior of the seat cushion's outer cover. The housing 661 and inner casing are secured to the outer cover via bolts. The button 662 is mounted on the housing 661; pressing the button 662 adjusts the leg rest 64. The electronic components are housed within the inner casing, ensuring they remain internal to the seat cushion 63. During transportation, the entire assembly (including the seat cushion 63 and embedded controller 66) can be vacuum-sealed and stored within the seat frame 1, eliminating the need for separate protective measures. This design resolves issues associated with conventional controllers exposed on armrests, such as susceptibility to damage during transit and poor ergonomic positioning, thereby enhancing operational accessibility, durability, and safety of the sofa.

Enhanced Modular Integration

Further, the base 61 of the electric seat 6 in the embodiments of the present application is provided with corresponding installation grooves on both lateral sides. These grooves enable free modular interconnection with the seat frame 1, armrest 4, or functional table 5. By embedding the controller 66 within the seat cushion 63, the design eliminates constraints imposed by armrest or table configurations, thereby expanding modular assembly flexibility.

Adaptability to Diverse Dimensions

It is understood that the dimensions of the base 61 may match or differ from those of the seat frame 1. To ensure universal compatibility, installation grooves may be strategically positioned based on component sizes. For example, in FIG. 2, an additional installation groove is provided between the two first installation grooves 11 of the seat frame 1 to accommodate interconnection with the base 61, flexibly adapting to varied dimensional requirements.

Figure 10:
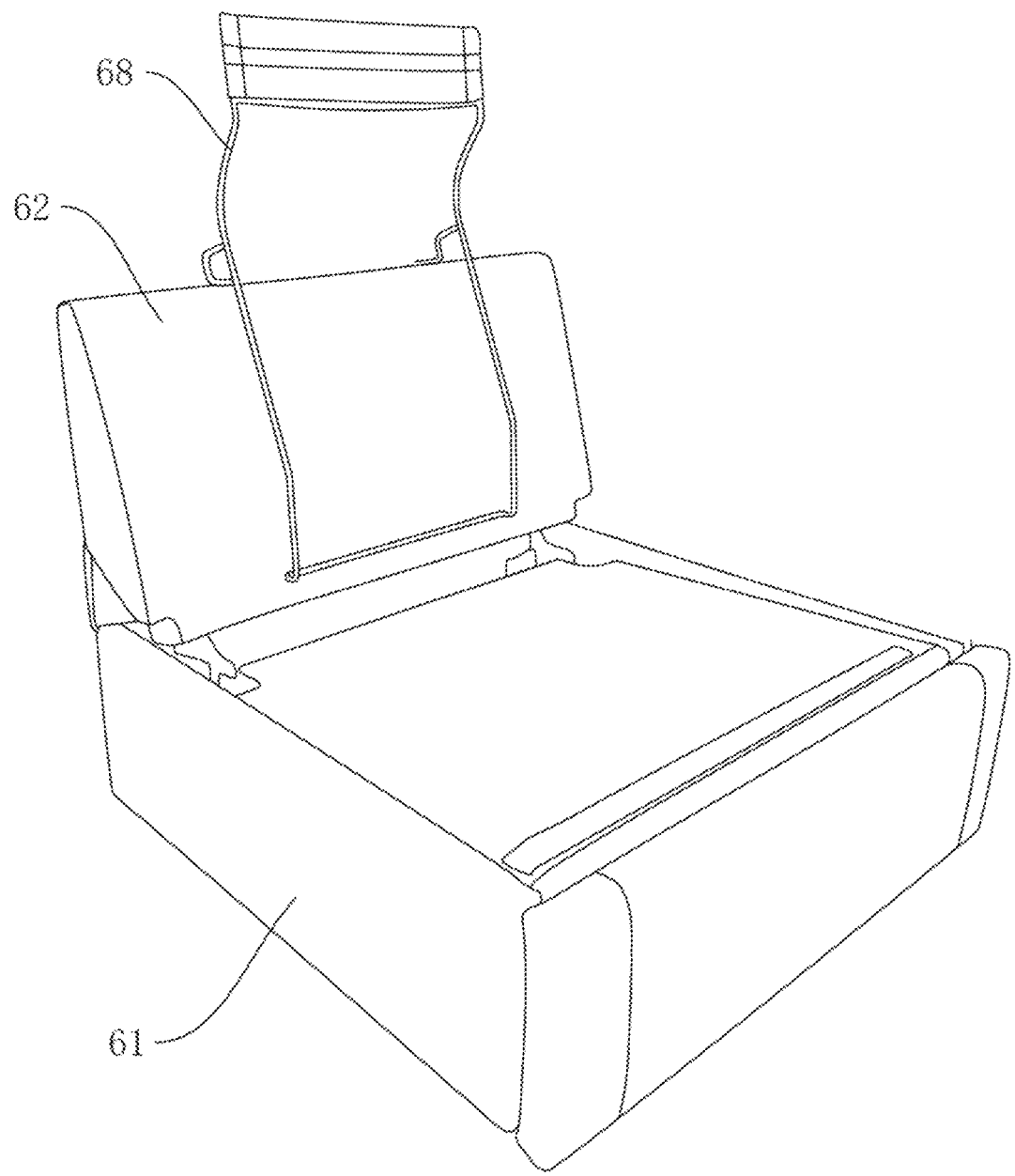
FIG. 10 is a schematic view of a partial structure of the electric seat according to an embodiment of the present application.
Figure 11:
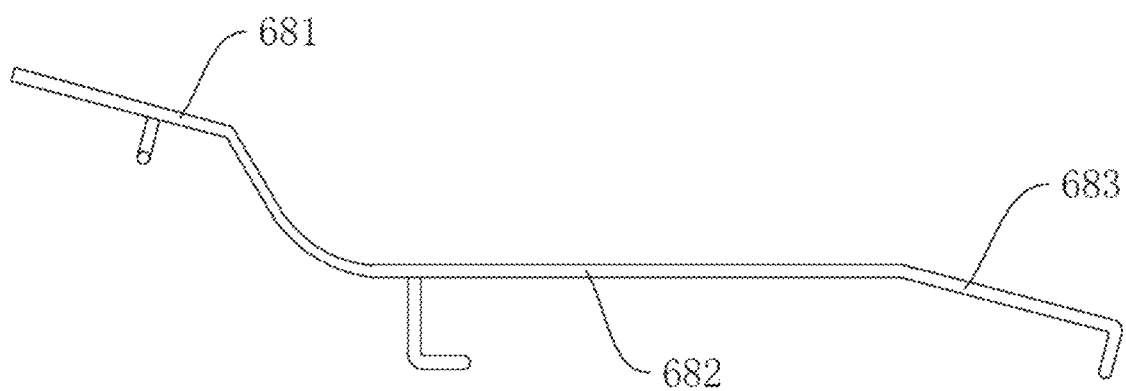
FIG. 11 is a schematic view of the overall structure of the fourth connecting piece according to an embodiment of the present application.

Referring to FIGS. 8 and 10

In some embodiments, the electric seat 6 further includes a headrest 67 and a fourth connecting piece 68. The headrest 67 is detachably connected to the fourth connecting piece 68 via methods such as snap-fit, plug-in, or hook-and-loop fasteners (not limited herein). The fourth connecting piece 68 is snap-fitted at its upper end to an upper portion of the back panel 62 and at its lower end to a lower portion of the back panel 62, facilitating secure attachment of the headrest 67. This configuration allows users to obtain ergonomic support while reclining, significantly enhancing comfort. Additionally, a back cushion 69 is disposed on the upper end of the base 61 to conceal the fourth connecting piece 68, improving aesthetics and user comfort.

Fourth Connecting Piece Design

In some embodiments, the fourth connecting piece 68 comprises a mounting portion 681, a first connecting portion 682, and a second connecting portion 683. The mounting portion 681, first connecting portion 682, and second connecting portion 683 are sequentially connected. The mounting portion 681 secures the headrest 67, while the first and second connecting portions 682, 683 engage the back panel 62.

The angle between the mounting portion 681 and the first connecting portion 682 is 121 degrees, with an arc-shaped transition at the junction to enhance ergonomic comfort.

The angle between the first connecting portion 682 and the second connecting portion 683 is 165 degrees, ensuring stable attachment to the back panel 62.

Operational Principle of the Embodiment

To assemble the sofa, a lateral side (short side) of one seat frame 1 is abutted against a lateral side (short side) of another seat frame 1. Two first connecting pieces 2 are then employed to interconnect the seat frames 1. Specifically:

The connecting portion 21 spans across the upper ends of the two seat frames 1.

The two snap-fit portions 22 are snap-fitted into the second installation grooves 12 of the respective seat frames 1, achieving a simple and user-friendly interconnection.

The outwardly curved hook portions 23 abut against inner walls of the second installation grooves 12, ensuring structural stability between the interconnected seat frames 1.

The invention claimed is:

1. A modular sofa assembly characterized by comprising at least two seat frames and at least two first connecting pieces; wherein each seat frame is configured in a rectangular shape, with two first installation grooves spaced apart on each longitudinal side of the seat frame and two second installation grooves spaced apart on each lateral side of the seat frame; the distance between the two first installation grooves is equal to the distance between the two second installation grooves;

wherein each first connecting piece includes a connecting portion, two snap-fit portions, and two hook portions;

wherein the two snap-fit portions are respectively disposed at opposite ends of the connecting portion, and the two hook portions are respectively located at distal ends of the snap-fit portions away from the connecting portion; the hook portions are curved outward in directions away from each other;

wherein when a side of one seat frame abuts against a side of another seat frame, the connecting portion spans across the two seat frames; the snap-fit portions are respectively engaged with either the first installation grooves or the second installation grooves of the two seat frames, while the hook portions abut against inner walls of the corresponding first or second installation grooves.

2. The modular sofa assembly of claim 1, wherein each lateral side of at least one seat frame is further provided with two third installation grooves spaced apart; the distance between the two third installation grooves is equal to the distance between the two second installation grooves.

3. The modular sofa assembly of claim 1, wherein the distance between distal ends of the two snap-fit portions away from the connecting portion is less than a length of the connecting portion.

4. The modular sofa assembly of claim 1, further comprising a functional component modularly attached to at least one seat frame, wherein the functional component is selected from the group consisting of a backrest, an armrest, and a functional table.

5. The modular sofa assembly of claim 4, wherein the backrest includes a backrest body and two second connecting pieces spaced apart on one side of the backrest body; the two second connecting pieces are respectively snap-fitted into two adjacent first installation grooves or two adjacent second installation grooves of the at least one seat frame.

6. The modular sofa assembly of claim 5, wherein the backrest further includes a third connecting piece rotationally connected to a lower end of the backrest body; wherein a lower end of the at least one seat frame is provided with a plurality of snap heads spaced apart along a circumferential direction of the seat frame, and the third connecting piece is snap-fitted to one of the snap heads.

7. The modular sofa assembly of claim 4, wherein the functional table includes a mounting base; wherein two snap grooves are spaced apart on each side of the mounting base, and a distance between the two snap grooves is equal to a distance between the two second installation grooves; one of the snap-fit portions of the first connecting piece is snap-fitted into either the first installation groove or the second installation groove, while the other snap-fit portion is snap-fitted into one of the snap grooves.

8. The modular sofa assembly of claim 1, further comprising an electric seat; wherein the electric seat includes a base, a back panel, a seat cushion, a leg rest, a driving member, and a controller; the back panel and the seat cushion are disposed on an upper end of the base; the leg rest is rotationally connected to the base, and the driving member is configured to drive rotation of the leg rest; the controller is electrically connected to the driving member.

9. The modular sofa assembly of claim 8, wherein the controller is disposed within a side portion of the seat cushion.

10. The modular sofa assembly of claim 8, wherein the electric seat further includes a headrest and a fourth connecting piece; the headrest is detachably connected to the fourth connecting piece, and the fourth connecting piece is snap-fitted at both ends to opposing ends of the back panel.

* * * * *